United States Patent
Zatkin et al.

(10) Patent No.: US 8,825,642 B2
(45) Date of Patent: Sep. 2, 2014

(54) GAME RECOMMENDATION ENGINE FOR MAPPING GAMES TO DISABILITIES

(75) Inventors: Geoffrey C. Zatkin, Encinitas, CA (US); Gregory T. Short, Carlsbad, CA (US)

(73) Assignee: Electronic Entertainment Design and Research, Carlsbad, CA (US)

( * ) Notice: Subject to any disclaimer, the term of this patent is extended or adjusted under 35 U.S.C. 154(b) by 28 days.

(21) Appl. No.: 13/357,462

(22) Filed: Jan. 24, 2012

(65) Prior Publication Data

US 2012/0197874 A1    Aug. 2, 2012

Related U.S. Application Data

(60) Provisional application No. 61/436,849, filed on Jan. 27, 2011.

(51) Int. Cl.
*G06F 17/30* (2006.01)

(52) U.S. Cl.
USPC .......................................................... 707/728

(58) Field of Classification Search
CPC ..................... G06F 17/30867; G06F 17/30991
USPC .................................................. 707/722, 728
See application file for complete search history.

(56) References Cited

U.S. PATENT DOCUMENTS

| | | | |
|---|---|---|---|
| 5,474,295 A | 12/1995 | Demshuk | |
| 6,299,452 B1 | 10/2001 | Wasowicz et al. | |
| 6,352,478 B1 | 3/2002 | Gabai et al. | |
| 2002/0076677 A1* | 6/2002 | Wasowicz et al. | 434/178 |
| 2004/0014021 A1 | 1/2004 | Suleiman | |
| 2004/0212149 A1* | 10/2004 | Farmer | 273/242 |
| 2006/0127871 A1 | 6/2006 | Grayson | |
| 2007/0054738 A1* | 3/2007 | Muir | 463/42 |
| 2008/0070682 A1* | 3/2008 | Woody | 463/30 |
| 2008/0261699 A1* | 10/2008 | Topham et al. | 463/42 |
| 2009/0172035 A1 | 7/2009 | Lessing et al. | |
| 2009/0309891 A1 | 12/2009 | Karkanias et al. | |
| 2010/0005952 A1 | 1/2010 | LaMon | |
| 2010/0113152 A1 | 5/2010 | Shmuel | |

FOREIGN PATENT DOCUMENTS

| | | |
|---|---|---|
| EP | 2343106 | 7/2011 |
| WO | 99/08762 | 2/1999 |
| WO | 2011/002403 | 1/2011 |

\* cited by examiner

*Primary Examiner* — Joshua Bullock
(74) *Attorney, Agent, or Firm* — Fish & Tsang, LLP

(57) ABSTRACT

A game recommendation engine is presented. Contemplated game recommendation engines are configured to establish correlations among game attributes and attributes of known disabilities. The recommendation engine can further identify or quantify relationships among games and disabilities having the correlated attributes. The relationships can be used to generate and present recommendations to users. For example, a game design can receive recommendations on game features to incorporate into game to be compatible with or accessible to a disabled person, or a disable person can receive recommendations on games that are accessible to or compatible with o them based on their disabilities.

20 Claims, 4 Drawing Sheets

Game Object
210

Attributes
- Genre
  - FPS
  - Role Playing
  - RTS
  - Etc.
- Art
  - Artists
  - Style
  - Palette
  - Lighting
  - Etc.
- Interfaces
  - Controller
  - Keyboard
  - Mouse
  - Tablet
  - Screen
  - Audio I/O
  - Etc.
- Characters
  - # of characters
  - Male lead
  - Female lead
  - Supporting character
  - Etc.
- Licenses
  - Disney®
  - Sony®
  - Etc.
- Developers
  - Company
  - Producer
  - Publisher
  - Studio
  - Etc.
- Etc.

Disability Object
220

Attributes
- Type
  - Mental
  - Cognitive
  - Developmental
  - Physical
  - Malady
  - Illness
  - Etc.
- Symptoms
  - Attention deficit
  - Slurred speech
  - Shaking
  - Color blindness
  - Etc.
- Experts
  - Consultants
  - Researcher
  - Insurance
  - Healthcare provider
  - Etc.
- Identification
  - Name
  - Diagnosis requirements
  - Etc.
- Geography
  - Nation
  - State
  - City
  - Land formation
  - Body of water
  - Etc
- Etc.

Figure 2

Recommendations(s)
(Compatibility Scores; etc.)
437

Disabilities (e.g., Dichromacy Color Blindness)

| Game Objects/Features | | Protanopia | Deuteranopia | Tritanopia | Etc. |
|---|---|---|---|---|---|
| | Use of red | -0.9 | -0.7 | -0.2 | ... |
| | Use of blue | -0.4 | -0.8 | -0.9 | |
| | Use of yellow | -0.2 | -0.8 | -0.6 | |
| | Controller | N/A | N/A | N/A | |
| | Frames per second | 0.1 | 0.1 | 0.2 | |
| | Etc. | | | | |
| | ... | | | | ... |

GAME RECOMMENDATION ENGINE FOR MAPPING GAMES TO DISABILITIES

This application claims the benefit of priority to U.S. provisional application having Ser. No. 61/436,849 filed on Jan. 27, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is game marketing technologies.

BACKGROUND

The video game market has grown tremendously since the advent of readily available computer systems and growth of the Internet. Video game designers or developers create video games while targeting specific demographics of game players. Unfortunately, video games are often developed under the assumption that all game players are equally capable of interacting with game features. Such an assumption can place the game play outside the reach of individuals having one or more disabilities.

Interestingly, a great deal of effort has been applied toward using games of various forms, including computer-based games, to assess or diagnose different types of disabilities. For example, U.S. Pat. No. 6,299,452 to Wasowicz et al. titled "Diagnostic System and Method for Phonological Awareness, Phonological Processing, and Reading Skill Test", filed Jul. 9, 1999, describes using graphical games to test a person's phonological abilities. Similarly, U.S. patent application publication 2004/0014021 to Suleiman titled "Apparatus and Method for Evaluating School Readiness", filed Jul. 17, 2002, describes using computer-based games to evaluate if a child is ready for school. Still further, U.S. patent application publication 2006/0127871 to Grayson titled "Method and Apparatus for Teaching", filed Feb. 10, 2006, describes tracking a student's progress through interactive computer lessons where the student can be assessed or evaluated for learning disabilities based on their interactions. Although useful for assessing or diagnosing disabilities through a priori constructed games, the techniques disclosed in these references fail to provide insight into how to adapt a game for a disabled game player.

Others have directed their efforts toward customizing games specifically for disabled persons. For example, U.S. Pat. No. 5,474,290 to Demshuk titled "Game Apparatus for the Handicapped", filed Aug. 24, 1994, describes table game apparatus adapted for use by a person having physical or mental handicaps. Another example includes U.S. patent application 2004/0212149 to Farmer titled "Social Skill Builder Game", filed Apr. 21, 2004, which describes a board game adapted to develop and improve behavior skills for children and adults with developmental disabilities. Still further, U.S. patent application 2008/0070682 to Woody titled "Systems and Methods for Providing Educational Games for Use by Young Children, and Digital Storage Mediums for Storing the Educational Games Thereon", filed Aug. 15, 2007, discusses providing a controller that can be grasped by a young child or person with a disability. These references also specifically contemplate a priori constructed games or game elements to make the game accessible to a disabled person.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

The above references fail to appreciate that a game designer, especially a video game designer, requires insight into how to adapt their specific game under development for disabled individuals. In addition, the references fail to provide for a disabled person to identify which games would be accessible to their specific circumstances. Thus there is a need for obtaining recommendations on mapping games or game features to aspects of disabilities.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

SUMMARY OF THE INVENTION

The inventive subject matter provides apparatus, systems and methods in which one can utilize a game recommendation system to identify game attributes that are accessible or compatible with a disability. One aspect of the inventive subject matter includes a game recommendation engine having access to a game database and a disability database. The game database preferably stores game objects representing games (e.g., video games, board games, sports, etc.) and, in a similar vein, the disability database stores disability objects representing disabilities that a person might have (e.g., color blindness, mental or cognitive issues, physical disabilities, sensory issues, etc.). Each of the types of objects preferably having one or more corresponding attributes describing the nature of the object. Contemplated recommendation engines further comprises one or more query interfaces through which a user can submit a query to the system. A correlation engine coupled with the query interface in preferably configured to establishing one or more correlations among game attributes and disability attributes where the attributes satisfy the requirements or optional conditions of the query. Further, the correlation engine leverages the correlations to identify relationships between games and disabilities having the correlated attributes. Relationships are considered to represent quantified or quantifiable associations among game object and disability objects based on their corresponding attributes. The relationships can based on curve fitting, cluster analysis, time varying cloud plots, or other types of analysis. The correlation further utilizes the relationships to generate one or more recommendations of associating game objects or features with disability objects. In some embodiments, the recommendations can include recommended game features, a type of game attribute, which are compatible/incompatible or accessible/inaccessible with a disability. The correlation engine can configure an output device to present the recommendation to a user. For example, a game developer using an integrated development environment (IDE) can submit queries, possibly automatically via an interface module in the IDE, to the recommendation engine. In response, the recommendation engine can return a listing of recommendations in the form of a ranked listing of game features that could be integrated in to the game under development. The game features could include source code, modules, libraries, or other type of elements that support the game features and that can be integrated into the build structure of the game in the IDE.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 2 is an overview of data objects including game objects and disability objects having attributes.

DETAILED DESCRIPTION

Figure 1:
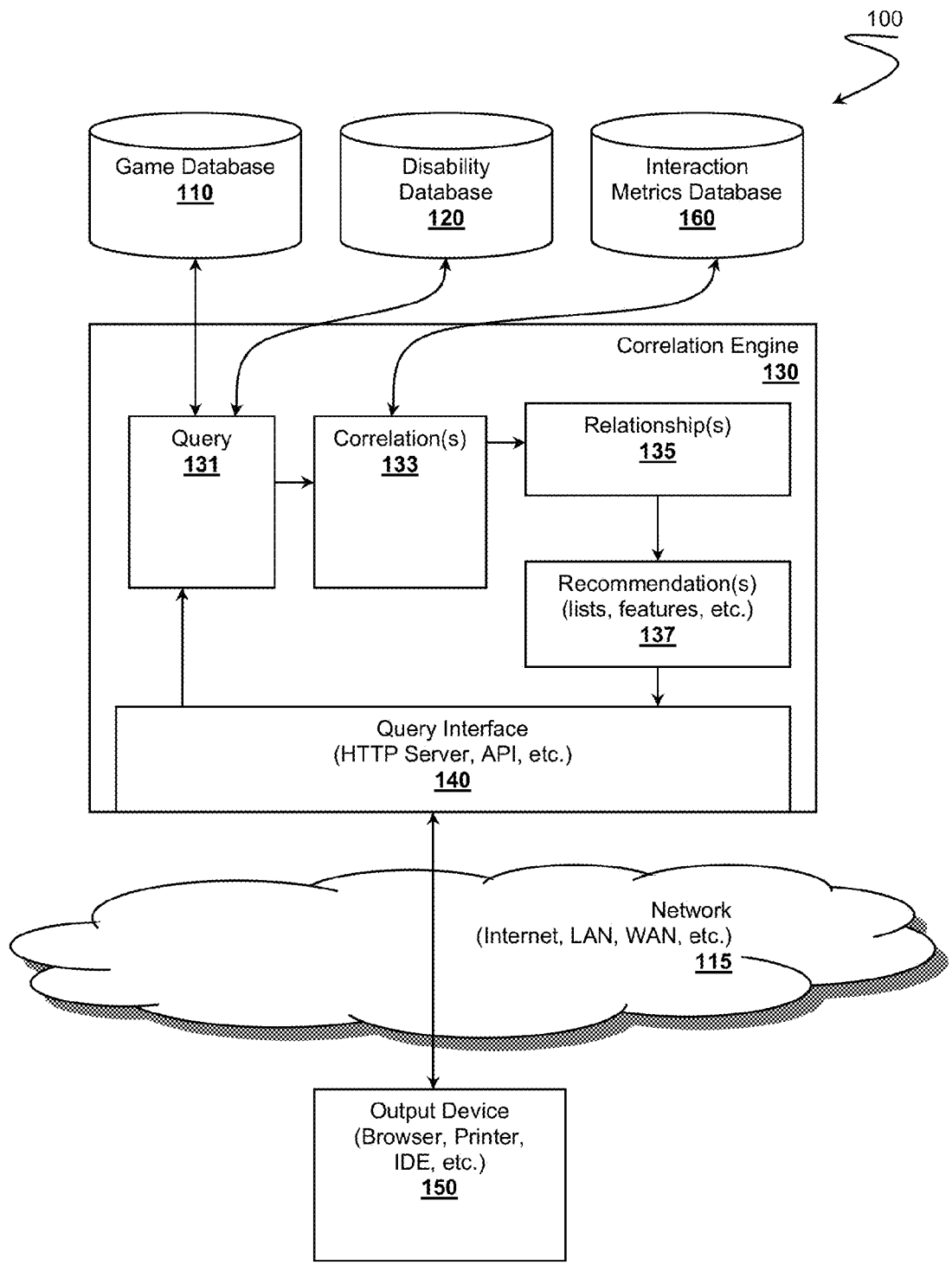
FIG. 1 is a schematic of game recommendation engine.

It should be noted that while the following description is drawn to a computer/server game recommendation system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including generating signals that can be used to configure an output device to provide recommendations on mapping game features or other attributes to aspects of one or more disabilities.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. For example, the following discussion is mainly directed toward video games and color blindness. However, the concept of game can be extended to include board games, card games, sports, or possibly other types of media (e.g., print media, movies, books, advertisements, audio, etc.). Additionally, disabilities can include physical, sensor, mental, or other types of disabilities. Thus, the inventive subject matter is considered to include all possible combinations of games and disabilities.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the networking context, the term "coupled to" or "coupled with" should be construed to mean "communicatively coupled" over a network connection.

Individuals with disabilities (physical, sensory, cognitive, etc.) have a hard time identifying which games will provide them with an optimal play experience. People who make games are often lack familiarity with the feature, styles of features, or implementations that allow individuals with disabilities to have optimal play experiences. Additionally, some features or styles of feature implementations have the ability to assist with rehabilitation, education and/or training Consumers continue to have a hard time identifying games that assist with these. Game developers also continue to have a hard time identifying which features/styles of feature implementations they should build into their games to assist with rehabilitation, education and/or training.

The following disclosure discusses apparatus, systems and methods in which a one can query a recommendation engine to determine which game features enhance or hinder a disabled person's game play experience. In addition, a game developer can query the system to determine which features could be added to target a disability market, or should be removed to ensure market acceptance. Furthermore, contemplated systems can be used to determine if one or more game features (e.g., game attributes) have therapeutic or diagnostic effects.

In FIG. 1 game recommendation engine 100 includes multiple components coupled with each other and configured to generate recommendations on mapping game features or attributes with disabilities. Although example recommendation 100 is illustrated as communicating over a network 115, one should appreciate that the intercommunication of the elements can occur within a single network, or even within a single computer device.

In more preferred embodiments, game recommendation engine 100 operates a for-fee service allowing one or more remote paying clients or subscribers to access the functionality of game recommendation engine 100. An example for-fee service capable of supporting the disclosed functionality includes the services offered by Electronic Entertainment Design and Research (EEDAR; see URL www.eedar.com). EEDAR offers access to more than 20,000 games and 20 million data points, EEDAR's enormous dataset of "Game DNA" enables them to supply previously unobtainable factual-based analysis and diligence services for the video game industry, which can be brought to bear on mapping game features or attributes to aspects of various disabilities.

Recommendation engine 100 preferably includes game database 110 and disability database 120. Game database 110 preferably stores a plurality of game objects where each game object represents a game, preferably a video game. As used herein the term "video game" means a game that configures one or more computing devices to present game entertainment to one or more device users. One should further appreciate the concept of a game can also include board games, table games, sports related games, game of chance, or other forms of activities associated with contests (competitive or cooperative). Each game object preferably includes game attributes or features describing the nature of the corresponding game.

Disability database 120 stores a plurality of disability objects where each disability object represents a disability. Disabilities cover a broad spectrum of different types of disabilities including physical disabilities, mental disabilities, cognitive disabilities, illnesses, sensory disabilities, or other types of disabilities. Similar to game objects, each disability object comprises one or more disability attributes that describe the nature of the corresponding disability. Disability attributes can include symptoms, names, diagnosis criteria, prognosis, demographic, treatment, or other information relating to the corresponding disability.

In some embodiments, recommendation engine 100 can further include one or more metric database 160, which includes metric data associated with interactions between disable individuals and games. The metric data could include review scores by disable individuals, actual game play experiences possibly in a log file, survey information, revenue information, or other types of data that can be leveraged to establish connections between game objects and disability objects.

Databases 110, 120, and 160 are illustrated as being integrated with recommendation engine 100. However, in some embodiments the databases could comprise data services or databases offered by third party entities. For example, disability database 120 could represent one or more disability databases available from the United Nations, a government, insurance company, or other entity. One example disability database that could be used as a foundation for, or operate as, disability database 120 includes Ireland's Physical and Sensory Disability Database.

Databases 110, 120, and 160 are also illustrated as separate databases. However, in some embodiments the databases can be integrated together if desired. For example, metric database 160 can have its data integrated into the objects within game database 110 or disability database 120. As statistics or other information is aggregated regarding games or disabilities rather than storing the information separately, the information can be converted to attributes and bound to corresponding objects.

Recommendation engine 100 preferably includes correlation engine 130 configured to analyze attributes of game objects and disability objects, possibly with respect to the metric data stored in metric database 160. One should appreciate that recommendation engine 100 operates as a service, which can be access by users who wish to conduct and analysis of the available data. Correlation engine 130 allows users to access its functionality via one or more query interface 140, possibly operating as an HTTP server. Correlation engine 130 receives one or more of query 131 from which to begin an analysis.

Query 131 can take many different forms depending on the nature of correlation engine 130. In some embodiments, query 131 can include a set of keywords or terms defining desirable analysis parameters. The terms can be mapped explicitly or via a translation module (not shown) to the game and disability attributes. For example, in some embodiments, the various types of attributes conform to a common, universal namespace allowing for easy retrieve or comparison of database object. A natural language query can be converted to the namespace so that the converted query can be submitted to the databases.

A user could manually submit the query terms, possibly using one or more logical operators (e.g., AND, OR, NOT, etc.) via query interface 140 or output device 150. In other embodiments, query 131 can include an automatically generated query, possibly based on XML, from an integrated development environment (IDE) or from a game. For example, a game developer could use an IDE that integrates with a software development kit (SDK) having modules capable of coordinating development or design of a video game with correlation engine 130. As the developer creates the video game, the IDE can automatically submit query 131 to seek recommendations on how to enhance or adapter game features to address aspects of a disability. Query 131 from the IDE can be packaged as serialized XML file having packaged attributes used to describe the game under development, modules, interfaces, art work, or other properties of the game. Similarity, query 131 can include a log file of game play; again possibly in a serialized format where the game play includes information about the game, game features, game environment, game player, disabilities of the game player, or other information.

Correlation engine 130 uses query 131 to obtain database objects from game database 110 or disability database 120 where the objects have corresponding attributes that satisfy the query. One should keep in mind that many possible objects, possibly hundreds or thousands or more, could fall within the scope of the query. Further, correlation engine 130 could also obtain information about interactions from metrics database 160 if applicable.

Correlation engine 130 attempts to establish correlations 133 among game attributes and disability attributes via one or more techniques. In some embodiments, correlation engine 130 seeks correlations 133 by analyzing game attributes with respect to disability attributes across all objects falling within the scope of query 131. In some embodiments, as referenced early, the attributes of the various objects can be mapped to a common universal namespace allowing correlation engine 130 to find correlated attributes through a simple comparison. Additional techniques can include multi-variate analysis, cluster plots, inference reasoning (e.g., inductive, abductive, deductive, case-base reasoning, etc.), genetic algorithms, simulated annealing, or other types of approaches that can seek out possible correlations. Such techniques can be apply automatically via correlation engine 130 or offered as tools to a user conducting the analysis. Correlation engine 130 can discover new relationships among games and disabilities by applying various correlation techniques across the vast amounts of game and disability information available.

Correlations 133 can also be established with respect to one or more metrics obtained from interaction metrics database 160. The metrics can represent measures associated with actual game play of disable people with disabilities corresponding to one or more disability objects in disability database 120. The game play can correspond with at least one of the game objects in game database 110. The metrics can be used establish a bridge between game attributes and disability attributes. For example, a game designer could construct query 131 to request all first person shooter (FPS) games played by color blind people. The result set from query 131 can then be used to establish correlations 133, if any, among the other attributes of the FPS game objects and disability objects based on actual game play data.

The metrics can include other types of information beyond game play possibly including survey data, reviews scores or information, medical statistics for disabilities, articles about disabilities or games, or other information. Each of these types of data can be brought to bear to aid in establishing correlations 133. One example technique that can be adapted to establish correlations 133 include those described in co-owned U.S. Pat. No. 7,580,853 to Short et al. titled "Methods of Providing a Marketing Guidance Report for a Proposed Electronic Game", filed Apr. 13, 2007.

Correlation engine 130 uses the correlations to identify one or more relationships 135 among game objects and disability objects. Preferably relationships 135 comprise one or more quantified or quantifiable associations between game features or attributes and aspects of the disabilities; disability attributes for example. Relationships 135 can be derived based on applying one or more mathematical techniques to the data including curve fitting (e.g., Chi-square fits, least squares fit, etc.), graphical analysis, cloud plots, trend analysis, or other techniques.

Correlation engine 130 generates recommendation 137 based on relationships 135 where recommendation 137 represents a suggested association between a game attribute from the game objects and a disability object. In some scenarios recommendations 137 can include a listing of recommended game features to be included into a game to enhance play for individuals with a specific or general type of disability. In other scenarios, recommendation 137 can include recommended games or game features accessible to a person having a specified disability. Still further recommendation 137 can represent as list of disabilities that might represent suggested markets to which the game should be directed. Recommendation 137 can comprises one or more quantified compatibility scores indicating compatibility between a game object or attribute to a disability object or attribute. When compatibility scores are present, relationships 135 can include a ranked listing of recommendations, features, disabilities, or other elements.

When recommendation 137 are available, correlation engine 130 configures output device 150 to present recommendations 137 in response to query 131. In some embodiments, output device 150 is instructed to render a web page having recommendations 137 within a browser. For example, output device 150 can be configured to present a table or graph illustrating the recommendation 137 between game attributes and disability attributes. In other embodiments, output device 150 can include an IDE through which a game developer creates a game. In such scenarios, output device 150 can receive recommendation 137 in the form of one or more modules, which can be integrated into a game build. Thus, recommendations 137 can configure an IDE to integrate recommendations 137. The IDE can be instructed via recommendations 137 to remove game features, change game features, modify game features, or otherwise alert a game to align with one or more disabilities.

FIG. 2 presents example game object 210 and disability object 220. Although the examples present bulleted listed of attributes, one should appreciate the game object 210 and disability object 220 can take on many different forms. Each of the game attributes or disability attributes can be single valued or multi-valued depending on the nature of the characteristics associated with the attributes. Example attributes having a single value might include a name or title. A game attribute of "title" could represent the game's actual released name; in a similar vein the disability attribute of "name" could represent a disability's common name or scientific name. Example attributes having multiple values could include a list, vector, or collection of information about a game or disability. In the examples show, the game attribute of "characters" could include an ordered listing of all characters in the game possibly ordered by length of appearance in the game, order of appearance, or role within the game. Similarly, a disability attribute of "symptoms" could include an ordered listing of required symptoms or conditional symptoms associated with the corresponding disability. Only a few attributes are presented within FIG. 2. However, one should appreciate that game objects 210 or disability object 220 could comprises hundreds, thousands, or more attributes.

The game attributes and disabilities attributes can be organized according to many different structures. In some embodiments, attributes can be organized in a hierarchical fashion somewhat similar to that shown in FIG. 2. One should appreciate that the hierarchical presentation does not necessarily have to be tautological in nature, but could allow for attributes to exist under one or more levels, layers, or roots in the hierarchal. Further, game objects 210 or disability object 220 can be organized as a vector of information where each member of the vector represents an attribute and takes on a value, possibly a measured value or a NULL value. Still further, the objects can be organized as a collection of attributes in the form of an N-tuple. Such organization of the attributes allows a correlation engine, or users, to analyze objects relative to each other.

In some embodiments, the attributes of game object 210 and disability object 220 take on values according to a common universal namespace. For example, as game or disability information is integrated into the system, the information available about the objects can be converted, if necessary, to the namespace via one or more attribute conversion modules. As information is obtained (e.g., crawling web site, importing data from data services, etc.), the conversion module applies a set of rules to covert the information to the namespace. Such an approach allows game object 210 to be compared to disability object directly 220. In fact, the inventive subject matter is considered to include mapping disabilities and game objects to a common namespace.

Consider a scenario where game object 210 represents an FPS game on a gaming console. The FPS game might have corresponding attributes describing the nature of the game's interface according to the common namespace, possibly of the form: Interface.Display="Television", Interface.Controller="Hand", or Interface.Controller="Audio". Disability object 220 might represent a disability having attributes in the same namespace of the form Symptom.Tremor="Hand". Thus, a correlation engine can establish a correlation between the Interface.Controller game attribute and the Symptom.Tremor disability attribute because they both are associated with the "Hand" value. One should appreciate the example scenario is a simple example presented for illustrative purposes. Contemplated recommendation engines can utilize much more complex namespaces and establish correlations among attributes based on value, names, existence, non-existence, times, or other types of attributes.

Correlation engine can discover or ferret out possible correlations among game objects 210 and disability objects 220 by comparing attributes of one against the other where the objects have attributes falling within the scope of a submitted query. For example, a user might submit a query for all sci-fi games (i.e., Genre attribute is "Sci-Fi) and disabilities associated with males between the ages of 18 and 34 (i.e., one or more Demographic attributes). The correlation engine can find a result set having game objects 210 or disability objects 220 that satisfy the query. Preferably the correlation engine is configured to atomically compare attributes of the objects against each other to fine correlations among the objects' attributes.

One should appreciate that the correlation engine is configured to discover correlations among the objects' attributes. In some embodiments, the correlation engine utilizes a common namespace to discover the correlation through simple comparisons of game attributes to disability object attributes. In other embodiments, the correlation engine can utility additional information that bridges interactions between the game objects and disability objects as suggested previously. Example additional information includes metrics derived from surveys, articles, reviews, web sites, or other sources that map a game to one or more disabilities.

Figure 3:
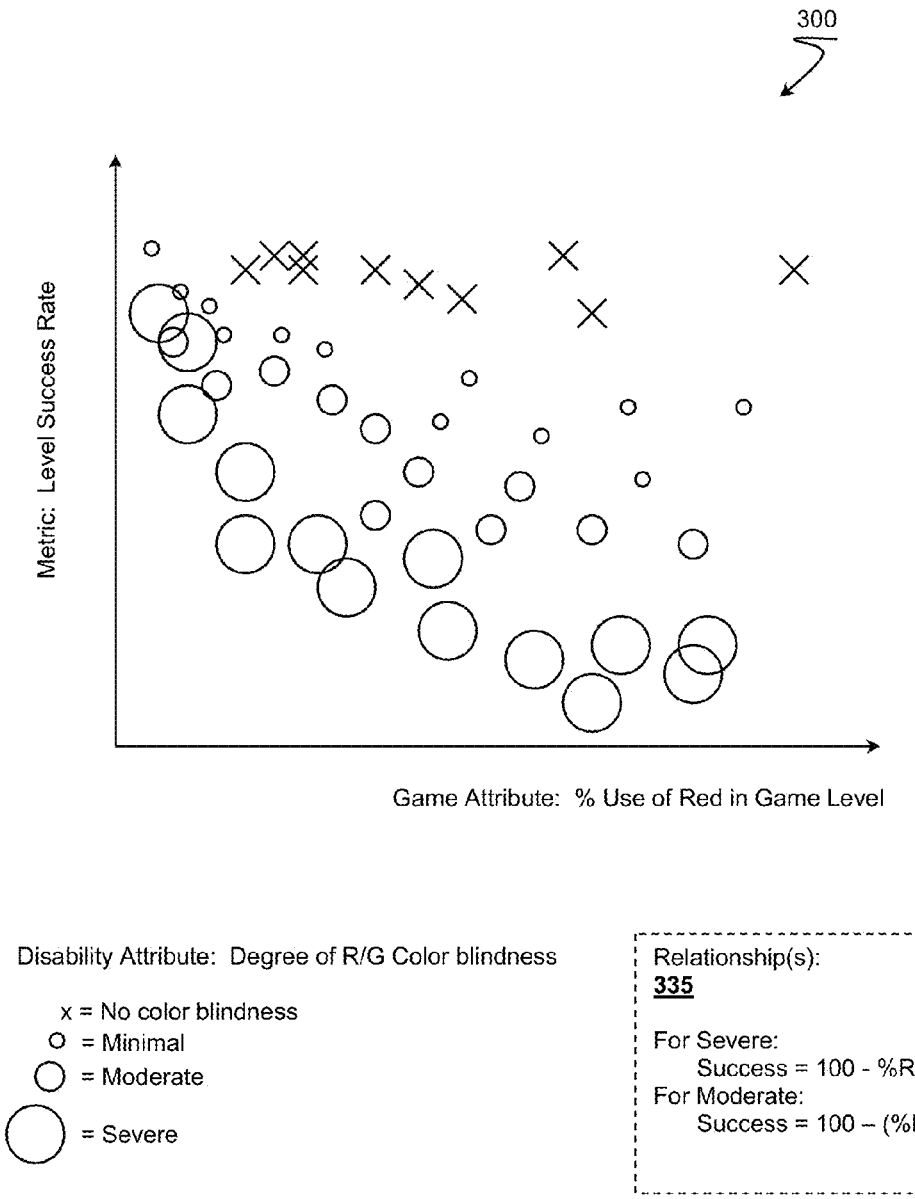
FIG. 3 is an example of a possible correlation between game attributes and disability attributes.

In FIG. 3, graph 300 illustrates a possible scenario where a correlation engine might discover a correlation among game attributes and disability attributes. In the example, a user has submitted query for games having a game attribute representing an amount of red color (i.e., game attribute) used in a level of the game. The user, possibly automatically via the correlation engine, plots player success rate (i.e., a metric) for completing the levels, where the players suffer from a degree of color blindness (i.e., a disability attribute).

Based on the result set that satisfies the query, the correlation engine could establish one or more correlations from the data. The correlation engine might establish a first correlation between the level success rate and individuals lacking color blindness. Further, the correlation engine might also discover that a severe level of color blindness is correlated with a percentage of red used in a level design. Although the example presented in a fictitious example, it still illustrates that correlations can give rise to useful information for a game designer or a disabled game player.

A game designer finds the information advantageous because they are able to adapt their game by adjusting use of red to offer a greater play experience to those who suffer from color blindness. A disable game player finds the information advantageous because they are able to find games that are accessible to them. When the correlations are established, the correlation engine can identify one or more relationships 335.

Relationships 335 represent a quantified association between game attributes, disability attributes, or metrics. In the example shown, relationships 335 comprises simple linear associations, possibly based on a least squares fit to the data. Thus, the data suggests that individuals suffering from severe color blindness with respect to red would likely have a better game play experience with games having less red. Further, the data suggests that a game designer should consider reducing the amount of red in a level to make their game more accessible to individuals who suffer from severe color blindness.

Figure 4:
FIG. 4 is an example set of recommendations among game objects or features with respect to disabilities.

In FIG. 4, table 437 represents a plurality of recommendations among games, or game features, and disabilities and continues to explore the previous example of color blindness where the columns of the table represent types of Dichromacy color blindness (e.g., Portanopia, Deuteranopia, Tritanopia, etc.). The rows of table 437 represent features or attributes associated with games. Each cell represents a compatibility score between the game feature and the disability where the compatibility score aids in deriving recommendations.

Compatibility scores represent derivations from the quantification of a relationship and can be calculated using various techniques as a function of the correlation or rules for establishing a recommendation. The compatibility scores illustrated in table 437 represent a scalar value indicating how compatible a game feature is to the disability where the scalar value represents an normalized value between −1.0 (strongly recommend against the feature for the disability) to 1.0 (strongly recommend use of feature for the disability). Further, the scalar value calculated based on all game objects having the feature and falling within the scope of the submitted query. Other ranges for a compatibility score are also contemplated.

Compatibility scores can also be multi-valued. For example, the scalar values in table 437 can be considered a weighted averaged over all game objects (or disability objects) in the result set. The compatibility scores can also include an error margin for the scalar values (e.g., a distribution width, error bars, etc.), thus the compatibility score could include a value and an error associated with the value. Further, compatibility scores can vary as feature or disability attributes vary. As indicated in FIG. 3, a use of red might have a somewhat linear relationship with respect to a color blind individual's success rate at completing levels of a game where the parametric values of the linear relationship can be derived from a least squares fit or other technique. Regardless of how the relationships are derived, the correlation engine can configure an output device to present the relationships, possibly within browser of the output device.

One should appreciate that recommendations can change with time as new game objects, disability objects, metrics, or other information becomes available. Further, such recommendations can provide indications if one or more games offer therapeutic or diagnostic effects. For example, recommendations could be individualizes or characterized by demographics as a function of time. If the recommendations provide stronger alignment between game attributes and disabilities, then changes to the game might have improved game play or changes in game play might indicate the game player has improved.

One should appreciate the distinction between compatibility and accessibility with respect. The concept of compatibility is considered to represent a degree to which a game or game attribute can exist with respect to a disability without requiring modification. The concept of accessibility represents a degree to which a disable person would be receptive to the game or game attribute. Thus, a game requiring a mouse would be incompatible to a disable person without hand, but still might be accessible to the person if another interface were provided. Alternatively, a game requiring deep puzzle solving might be inaccessible to a mentally handicapped individual, but could have compatible interfaces.

In view that the contemplated recommendation engines or systems can be used by game designers or game players, the recommendations can take on specific characteristics for the user. For example, in a use of game design, the recommendations can include a list of disabilities derived from the disability objects related to game objects where the disabilities are considered to be compatible with game play. In the example, games having the feature of "Frames per Second" (fps) are considered to be compatible across the types of color blindness. One should note that frames per second might be multi-valued having a range, perhaps from 10 fps to 60 fps for example where the compatibility score varies based on fps. Further, the relationships can include a list of disabilities derived from the disability objects related to game objects where the disabilities are considered to be incompatible with game play. For example, "Use of Red" is strongly incompatible with Protanopia. One should appreciate that term "compatibility score" is used euphemistically to represent a quantification of accessibility as well. Thus, the disclosed techniques relating to compatibility scores can be applied to accessibility scores.

With respect to a disabled game player, the relationships can include a list of game features derived from game objects related to disability objects where the game features are considered accessible by disable individuals associated with the disability objects. Based on the recommendations presented in table 437, games having a "Use of Yellow" are moderately compatible to those individuals having Protanopia. A user can define rules, criteria, or thresholds that define when objects fall within the specified categories: compatible, incompatible, accessible, inaccessible, etc. Still, further the listing for the disable person can include games or features that are considered inaccessible.

In view that the data aggregated by the correlation engine can include hundreds or thousands of objects, recommendations can include a ranked listing of recommendations where the recommendations are ranked by compatibilities scores. For example, the game designer might receive a ranked listing of color blindness disabilities ranked by compatibility scores, while a game player might receive a ranked listing of games or game features also ranked by the compatibility scores. Thus, the correlation engines are able to provide information by pivoting around one or more perspectives on the data.

The disclosed recommendation engine comprises many interesting uses cases. From the perspective of a game designer, the designer's IDE can be coupled with the recommendation engine. As the designer or developer continues development of the game in the IDE, the IDE can exchange game attribute information with the recommendation engine, possibly serialized in an XML format. In response, possibly in real-time, the recommendation engine can provide one or more recommendations on changes or enhancements to the game. Perhaps the recommendation engine might offer the designer the ability to create an optional color palette for the game to address color blindness. Further, the recommendations can also comprise a suggested module, user interface, design feature, or other game related options. The recommendation engine might provide recommendations on changing game attributes, possibly including video game genre, video game interfaces, or other video game features.

Yet another use case includes observing game play of a disable individual. The game play can be considered a query to the recommendation engine. Based on analysis of the game play (e.g., use of game attributes), a correlation engine can provide insight into possible disabilities that might be present to give rise to the type of game play. For example, the game play could be used to derive a disability signature from the attributes or game play metrics, which can then be used as a foundation for finding disability objects that, alone or combined, give rise to the signature. Thus, the recommendation engine can return a set of recommendations that include a listing of disabilities derived from disability objects related to games and are associated with the game play where the listings can be considered a diagnosis of potential disabilities.

Although color blindness is used as an example throughout this document, one should appreciate that disability objects can represent a wide range of disabilities while falling within the scope of the inventive subject. Thus, the recommendation engine can generate recommendations for games or features relating to physical disabilities (e.g., missing an appendage or digit, lack of motor control, etc.), sensory disabilities (e.g., deaf, blindness, color blindness, etc.), cognitive disabilities (e.g., ADD, ADHD, memory impairment, seizures, learning disorders, etc.), or other types of disabilities.

In view that the recommendation engine comprise vast amounts of data on games and disabilities, the recommendation engine can also established a rating for each game, each game feature, or attribute for each type of disability. Such an approach allows games to be ranked as being accessible or compatible for disable persons, or even ranked according to game play experience derived from actual game play by individuals with disabilities. As discussed previously, the recommendation engine can also attempt to identify disabilities based on game play for one or more games.

Disable individuals, or other users, can search for games accessible to them based on a query having attributes, possibly including identification of their disability, area of interest, game genre, ESRB rating, platform, game disability ratings, or other parameters. Individuals having more than one disability can receive recommendation information including a composite grouping of features, styles of features, or other data that related to their disabilities.

Yet another use case includes providing a game designer or developer information on how to assist those with disabilities. The recommendation engine can offer insight into which features or styles of implementations offer therapeutic value to disabled individuals. For example, the recommendation engine can recommend that a game controller input should be less sensitive, possibly time averaged, to remove jitter issues associated with a palsy. As game play continues; the time averaging can be increased or decrease to aid the game player as a form of physical therapy.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A game recommendation engine, the engine comprising:
   a computer system having a processor and a non-transitory computer readable storage medium storing software instructions;
   a game database functionally coupled to the computer system storing a plurality of game objects representing games, wherein each game object includes game attributes describing the corresponding game;
   a disability database functionally coupled to the computer system storing disability objects representing disabilities, wherein each disability object includes disability attributes describing the corresponding disability;
   a query interface implemented by the software instructions configured to accept a query; and
   a correlation engine implemented by the software instructions, and configured to:
      establish correlations among game attributes and disability attributes where at least some of the game attributes and disability attributes satisfy the query;
      identify relationships among game objects and disability objects as a function of the correlations;
      generate a recommendation on associating at least one of the game attributes with at least one of the disability objects based on the relationships; and
      configure an output device to present the recommendation in response to the query.

2. The engine of claim 1, wherein the recommendation includes an indication the game attribute is accessible to individuals having disabilities associated with the at least one of the disability objects.

3. The engine of claim 1, wherein the recommendation includes an indication that the game attribute is inaccessible to individuals having disabilities associated with the disability objects.

4. The engine of claim 1, wherein the recommendation includes an indication that an identified disability associated with the at least one of the disability objects is incompatible with game play associated with the at least one of the game attribute.

5. The engine of claim 1, wherein the recommendation includes an indication that an identified disability associated with the at least one of the disability attributes is compatible with game play associated with associated game objects.

6. The engine of claim 1, wherein the recommendation includes a ranked listing of recommendations according to compatibility scores between game attributes and disability attributes derived from the correlations.

7. The engine of claim 6, wherein the recommendations include recommended features derived from the game objects and ranked according to the compatibility scores.

8. The engine of claim 6, wherein the recommendations include recommended disabilities derived from disability objects and ranked according to the compatibility scores.

9. The engine of claim 1, further comprising a development environment interface configured to couple with a development environment.

10. The engine of claim 9, wherein the development environment interface comprises the query interface and the query is received automatically from the development environment.

11. The engine of claim 1, wherein the query comprises a representation of game play of at least one of the game objects from a disabled individual game player.

12. The engine of claim 11, wherein the recommendations include a listing of disabilities derived from disability objects related to game objects and that are associated with the game play.

13. The engine of claim 1, wherein the game objects represent video games.

14. The engine of claim 13, wherein the game attributes include at least one of the following: a video game genre, a video game interface, and a video game feature.

15. The engine of claim 11, wherein the representation of game play includes game features and disabilities of the disabled individual game player.

16. The engine of claim 1, wherein the correlation engine is further configured to establish correlations among game attributes and disability attributes with respect to interaction metrics associated with game play of disabled players associated with at least one disability object.

17. The engine of claim 1, wherein the correlation engine is further configured to establish the correlations among game attributes and disability attributes by using a value shared by at least one of the game attributes and at least one of the disability attributes.

18. The engine of claim 1, wherein the recommendation comprises a recommendation to change game attributes of a game object based on the at least one of the disability objects.

19. The engine of claim 1, wherein the relationships include a list of disabilities incompatible with at least one of the game objects.

20. The engine of claim 1, wherein the relationships include a list of game features accessible by disabled individuals associated with at least one of the disability objects.

* * * * *